(12) United States Patent
Staemmler et al.

(10) Patent No.: US 9,375,875 B2
(45) Date of Patent: Jun. 28, 2016

(54) METHOD FOR PROCESSING THERMOPLASTIC FILMS, THERMOFORMING SYSTEM, FILM SUPPLY STATION, FILM STRIP, USE, AND LAMINATED PART

(75) Inventors: Gernold Staemmler, Anger (DE); Reiner Huber, Ainring (DE)

(73) Assignee: Kiefel GmbH, Freilassing (DE)

( * ) Notice: Subject to any disclaimer, the term of this patent is extended or adjusted under 35 U.S.C. 154(b) by 120 days.

(21) Appl. No.: 14/001,706

(22) PCT Filed: Feb. 28, 2012

(86) PCT No.: PCT/DE2012/000185
§ 371 (c)(1),
(2), (4) Date: Sep. 6, 2013

(87) PCT Pub. No.: WO2012/116680
PCT Pub. Date: Sep. 7, 2012

(65) Prior Publication Data
US 2014/0010985 A1 Jan. 9, 2014

(30) Foreign Application Priority Data
Feb. 28, 2011 (DE) .......................... 10 2011 012 617

(51) Int. Cl.
*B29C 65/74* (2006.01)
*B29C 51/02* (2006.01)
B29C 51/26 (2006.01)
B29C 51/16 (2006.01)

(52) U.S. Cl.
CPC ............... *B29C 65/741* (2013.01); *B29C 51/02* (2013.01); *B29C 51/16* (2013.01); *B29C 51/262* (2013.01); *B29K 2995/0021* (2013.01); *Y10T 428/192* (2015.01)

(58) Field of Classification Search
CPC ............................ B29C 66/43; Y10T 429/19
USPC ............................................................ 428/19
See application file for complete search history.

(56) References Cited

U.S. PATENT DOCUMENTS 4,861,543 A * 8/1989 Rafferty ........................ 264/545
8,146,328 B2 4/2012 Tsuruta et al.

FOREIGN PATENT DOCUMENTS

| CN | 101663203 A | 3/2010 |
|---|---|---|
| DE | 17 04 141 A1 | 5/1971 |
| DE | 10 2004 029981 A1 | 1/2006 |
| DE | 101 13 524 B4 | 6/2006 |
| DE | 10 2006 048 296 A1 | 4/2008 |
| EP | 1 232 951 A2 | 8/2002 |

(Continued)

OTHER PUBLICATIONS

International Search Report of PCT/DE2012/000185, date of mailing Oct. 24, 2012.

(Continued)

*Primary Examiner* — Brent O'Hern
(74) *Attorney, Agent, or Firm* — Collard & Roe, P.C.

(57) ABSTRACT

A method for processing two different thermoplastic films in a thermoforming system selectively and variably brings on request cuts of the one or the other film in a conveyor through the thermoforming system, such that different successive cuts are conveyed by the conveyor to a thermoforming station and processed therein, and two successive cuts are joined into a film strip, either edge to edge or with an overlap.

10 Claims, 4 Drawing Sheets

(56) References Cited

FOREIGN PATENT DOCUMENTS

| EP | 1 521 669 B1 | 1/2006 |
|----|--------------|--------|
| JP | 55 051540 A  | 4/1980 |
| JP | 61 002527 A  | 1/1986 |

OTHER PUBLICATIONS

International Preliminary Report on Patentability of PCT/DE2012/000185, Sep. 3, 2013.

* cited by examiner

METHOD FOR PROCESSING THERMOPLASTIC FILMS, THERMOFORMING SYSTEM, FILM SUPPLY STATION, FILM STRIP, USE, AND LAMINATED PART

CROSS REFERENCE TO RELATED APPLICATIONS

This application is the National Stage of PCT/DE2012/000185 filed on Feb. 28, 2012, which claims priority under 35 U.S.C. §119 of German Application No. 10 2011 012 617.1 filed on Feb. 28, 2011, the disclosure of which is incorporated by reference. The international application under PCT article 21(2) was not published in English.

BACKGROUND OF THE INVENTION

1. Field of the Invention

The invention relates to a method for processing two different thermoplastic films in a thermoforming system, a thermoforming system set up for carrying out such a method, a film supply station for the thermoforming system, a film strip, a use for the film strip, and a laminated part produced therewith.

2. Description of the Related Art

It is generally known and, for example, in the sector of the automotive supply industry, it is frequently carried out on a daily basis to mold the surface of a spatial component by means of a film.

A common way to do this is the production of laminated parts. In the course of this, contour-formed parts are covered with a film. The film is unwound from a roll, fed to a thermoforming system, heated and subsequently thermoformed over the carrier part in a forming station, for example by using a vacuum. Thereby, laminating takes place. An example for this is disclosed in EP 1 521 669 B1.

An alternative way, which does not require carrier parts, is subsequent back injection of the film, which in practice is designated as film preforming.

During sequential production, thus the production of different molded parts with sequentially different requirements, for example in terms of the surface contour or the surface color, it is necessary to frequently change the film rolls because the films form the finally visible surface of the finished molding. Specifically in the automotive industry, many time-consuming roll changes are required because normally in the targeted sequential production, frequent changes in the component surface to be achieved are required.

Customary products in a motor vehicle can be found primarily in the interior, for example as dashboards, door panels, instrument panels, glove compartment, map pocket or cup holder, wherein this list is not to be understood as being complete.

In order to avoid many time-consuming film roll changes, no rolls are used, thus no film strip is used that is continuously unwound from the film roll. Instead, "blank cuts" are processed. This means nothing other than that the different film rolls are in each case separated. A blank cut, thus a piece of film, is separated from the film roll. At this point it should already be pointed out that a blank cut can be prepared not necessarily only by means of a cutting method, but in general by means of any separating method. However, in practice, cutting has emerged as the most common method. It is readily conceivable as an alternative to instead separate the blank cut from the film roll by means of punching, shearing or flame-cutting or in any other way. What is important is that a blank cut is obtained, thus such a piece of film, which is needed for the upcoming processing flow through the thermoforming system.

The size of the blank cut is normally kept as small as possible simply for cost reduction and environmental protection purposes.

Specifically in the case of a thermoforming system, usually, a clamping frame is arranged at the forming station. Within the forming station, the clamping frame seals film with respect to the vacuum box. Thus, the size of the clamping frame usually defines the required size of the blank cut. In particular with regard to the length of the blank cut, it is therefore intended in practice not to unnecessarily exceed the length of the clamping frame in the machine direction.

The blank cut is placed in the transport means that is generally available in a thermoforming system. The transport means are formed in most cases by pairs of belts, usually chain-driven, with needles, clips or cards, or by other transport chains. The transport means holds the blank cut placed thereon on both sides at the film edges and transports it in this manner through the thermoforming system.

Since generally a heating station is available, and the thermoforming system as such effects in any case heat irradiation onto the film, the blank cut needs to be additionally held on the infeed and outfeed sides with cooled transverse clamping bars so as to avoid a concave necking which otherwise would occur due to the influence of heat.

SUMMARY OF THE INVENTION

It is an object of the invention to provide a more suitable way for the sequential production of blank cuts in a thermoforming system.

According to a first aspect of the present invention, this object is achieved by a method for processing two different thermoplastic films in a thermoforming system, wherein on request selectively and varying from one film to another one, blank cuts are brought in a transport means through the thermoforming system so that different blank cuts are successively transported by the transport means to a thermoforming station and are processed there, wherein two successive blank cuts are connected to one another so as to form a film strip.

Conceptually, the following should be explained first:

"Processing" is in particular to be understood as achieving a semifinished product. It was already explained above that in particular producing surface-forming parts for the interior of a motor vehicle is to be envisaged. However, it is also readily possible to achieve a finished end product within the processing.

The "thermoforming system" is a system which plastically deforms the incoming film by supplying thermal energy.

The "request" for different parts within the targeted sequential production can preferably be obtained in real-time from an order-processing system. It is also conceivable to prepare the targeted production sequence by means of a statistical system, thus, for example, to request the different films in conformity with usual order rates, and to produce therewith the different surfaces. In the former case, stock-keeping can be completely dispensed with as long as it is provided that the parts produced in the thermoforming system are subsequently transferred immediately to the next production step. In the second case it is to be expected that an insignificant inventory of finished parts from the thermoforming system will form.

"Varying from one the film or the other film" is to be understood such that not necessarily only the one film or the other film shall be used, but that according to the production sequence, changes can occur that do not have to be predictable by the thermoforming system. However, the concept includes productions in which not always a change of the film type from blank cut to blank cut is required. It is readily possible that two or more blank cuts from the same film are successively prepared and processed. However, the invention exploits its advantage in particular exactly when a change of the film type takes place between two successive blank cuts.

If "two different films" are spoken of, this is not to be understood as being limited in the meaning of "exactly two", but is to be understood in the meaning of an "at least two" indication.

The same applies analogously within the context of the entire application present here: Indefinite articles or numerical data are in each case to be understood as "at least" indications unless it is clear from the context at a certain point that only an "exactly" indication is to be understood there.

The idea of the first inventive aspect is to connect two successive blank cuts in a thermoforming sequence to one another so as to form a film strip.

A "film strip" is such a strip that is longer than the blank cut preceding or succeeding the joint. To the length of the blank cut, viewed in the machine direction, thus along the transport direction through the thermoforming system, a further blank cut is fixed.

It is then no longer necessary to hold the transition from a first blank cut of a first film to a second blank cut of a second film at the heating station with the cooled transverse clamping bars. Rather, the two blank cuts connected to one another as a film strip mutually stabilize one another at their connected front ends. Since normally the film strip is held on the right and on the left at its edges anyway, for example with a needle chain, undesired necking of the film within the heating station is therefore not to be expected.

In particular, the presented inventive aspect has recognized that the transverse clamping bars, even with only a small width, still make additional waste practically unavoidable because the width of the blank cuts underneath the transverse clamping bar cannot be processed. The film region clamped by the transverse clamping bar thus increases the film consumption without being able to process the film used up through this so as to form the product.

Therefore, when carrying out the method, low film consumption can be achieved.

Preferably, the blank cuts are firmly fastened to one another, either edge to edge or with an overlap. When fastened edge to edge, thus front end against front end, maximum material savings can be achieved. In the case of an overlap of preferably only a few millimeters, connecting the two blank cuts is generally easier to carry out.

It is proposed that the blank cuts and/or the film strip are stretched within the process. Stretching serves, for example, for utilizing the film more efficiently because starting with a film delivered on a roll, the film thickness in the longitudinal direction and in the transverse direction can be reduced by stretching, and the surface area to be processed can be increased. Stretching in the longitudinal and transverse directions can be found, for example, in DE 101 13 524 B4 or again in DE 10 2006 048 296 A1.

Stretching can be performed on the blank cut before it is connected to form a film strip for further processing in the thermoforming system.

However, it is preferably intended to first prepare the film strip by connecting the successive blank cuts and then to stretch the resulting film strip in the longitudinal and/or transverse direction. This places higher requirements on the strength of the connection of the blank cuts; however, it saves new system constructions.

In the vertical direction, in any case approximately in that direction which is perpendicular to the machine direction and to the film plane within the system, attaching the blank cuts to one another preferably takes place in a flexible manner. This means that in the connected region of the two successive blank cuts, no excessive stiffening needs to take place there as this would have been the case, for example, when clamping using a transverse clamping bar in the heating station. Rather, it seems advisable to leave the film substantially to itself and to its sag. In fact, when heating up the film within the thermoforming system, the film becomes softer and a certain sag occurs between the transport means at both edges of the film. This sag has already been addressed in the prior art by proven compensation means, for example by transverse stretching. This is usually achieved through divergently running conveyor belts. Thus, if the film is not excessively stiffened at its joint or overlapping edge of successive blank cuts, but is substantially left to its free sagging flexibility, this can be advantageous from a system point of view.

The blank cuts can be connected to one another with connecting points and/or can be provided with a connecting line. This means that at their front ends facing one another, the blank cuts are connected to one another with a plurality of discrete connecting points or with a track-like connection, wherein the latter does not necessarily have to extend in a straight line, but can deviate from a straight course. In particular, two or more point rows that are offset to one another are possible for connecting, or two or more lines that are offset to one another. It is generally preferred that the connection points are oriented rather transverse to the machine direction, preferably perpendicular to the machine direction. It is then still particularly easy to deflect the film in the system.

For connecting the successive blank cuts to one another, in particular gluing, sewing, welding and/or another mechanical connecting process can be considered, for example by using a connecting part such as a connecting strip, adhesive strip, a clamp or the like.

In a particularly preferred embodiment of the invention, the connected region of two successive blank cuts are fed exactly to a first clamping frame position so that a clamping frame closes on a joint of the two blank cuts.

In view of the above, the clamping frame can in particular close on a connecting line or on connecting points and/or on an overlap region of two blank cuts.

The general idea here is that the clamping frame itself, thus the component for ensuring the thermoforming (vacuum) pressure, has a certain overall width. The clamping frame generally consists of an upper part and a lower part, which close against one another. The film is clamped over the clamping frame width in the forming station and cannot participate in the formation of the product. Thus, the film area clamped in the clamping frame cannot be avoided as waste anyway.

It is useful if exactly the transition edge between the successive and normally different films is used as this unavoidable waste since the transition is likewise waste anyway.

Preferably, the blank cuts, or at least a portion of the blank cuts, are provided with the average length (averaged from inner and outer lengths) of the clamping frame so that the clamping frame closes not only at a first, infeed-side clamping frame position on the on the joint of two blank cuts, but in addition also at a second, outfeed-side clamping frame position on a joint of the preceding one of the two blank cuts with the third blank cut.

In simple words, the clamping frame which seals the film with respect to the vacuum box is not avoided in such an embodiment. Rather, it is used in a proven manner in the thermoforming system although it requires a certain constructional width which increases the film consumption. However, the film transport is controlled or regulated in such a manner that with each machine cycle, the seam of the blank cuts is positioned in alignment with the clamping frame.

It is then possible to use proven technology again because the film strip joined together from the blank cuts forms a continuous strip again which does not require cooled transverse bars or other deviations from conventional single-strip systems.

With regard to the different blank cuts it is in particular envisaged that they can consist of different materials, can comprise different materials and/or can have different colors.

It is proposed that a system program is varied depending on the requested blank cut. Today's systems are normally at least controlled, in most cases even feedback-controlled. The feedback control concerns, for example, the stretching of the film strip in the transverse direction, the stretching of the film strip in the longitudinal direction, the temperature and the distance of the radiant heaters from the film strip, the thermoforming pressure, the residence time in the heating station or in the molding tool. All parameters can be individually optimized for each blank cut.

A system control can be set up in such a manner that it recognizes if two poorly combinable blank cuts are successively requested or are in any case still within the thermoforming system so that they are subjected to the same machine cycle. The control of the thermoforming system can receive a pool of requests and preferably processes them successively in the technically best manner, independently of the concrete input sequence of the requests.

In a particularly simple and nevertheless reliable form of connection of two successive blank cuts, an adhesive can be applied on the film strip.

In a particular constellation, hot glue, so called "hot melt" could also be used as an adhesive.

Hot melt is applied in the hot state onto the intended bonding area and when cooling down, it establishes the bond. Thus, it is in particular envisaged to apply hot melt for other purposes at suitable places onto the film strip, either onto the blank cuts prior to connecting them, or onto the already connected film strip. Hot melt application is very well suited for improving adhesion on certain laminating carriers. For laminating side panels in the motor vehicle interior, for example, hot melt application is considered to be useful.

The hot melt can already be applied when preparing the film strip or only when feeding it into the thermoforming system, preferably upstream of a heating station.

In a preferred configuration of the method it is proposed that the different blank cuts are fed from different rolls, wherein they are preferably separated into blank cuts at a common separating station.

The different films are normally delivered on different film rolls. Ideally, they are provided alternatively accessible in a common support frame. One or more roll-off units can be provided so as to unwind the films from the rolls.

Preferably, there is only a single separating station which separates the different films unwound from the rolls into the different blank cuts.

Preferably, connecting the successive blank cuts so as to form a film strip is carried out directly at the separating station or on the outfeed side of the separating station. For example, separating the rear end edge of a blank cut can take place simultaneously with connecting the front end edge of the same blank cut to the preceding blank cut which preferably is already at least partially held in place in the transport device of a thermoforming system that begins there.

It has already been mentioned that the method can ideally be used for laminating a contour-formed carrier part or for preforming films, in each case in particular for providing an interior surface part for a motor vehicle.

As the actual forming technology, thermoforming or back injection is preferably to be considered.

According to a second aspect of the present invention, the given object is achieved by a thermoforming system which is suitable and set up for carrying out the above-described method at least in partial aspects, wherein the thermoforming system has a thermoforming station for processing the different films, further has transport means for transporting the film to the thermoforming station, and in addition a connecting station for connecting successive blank cuts so as to form a film strip.

It has already been conceptually explained that the "connecting station" can be either a separate station or can belong to the system especially within the transfer through the thermoforming system.

However, the connecting station is preferably combined with other stations, for example combined with a hot melt station, and/or is combined with a separating station because only from the separating station onward are there individual blank cuts available which then are to be connected to one another. It makes sense to carry this out as fast as possible, thus in particular even before a possible stretching in the longitudinal direction and/or in the transverse direction takes place. The separating station does not have to be part of the actual thermoforming system. Rather, the separating station can be operated arranged in spatially separated manner.

The thermoforming system in its broader sense, thus including the roll holders, the separating station and the connecting station, preferably comprises a plurality of different film rolls, in particular with an unwind device and a separating device for preparing the blank cuts.

The thermoforming system and/or a separate film strip production system can comprise a controller which is set up for processing a request for a certain film and thereupon controls a film, in particular a film roll, so that a blank cut is prepared therefrom and is connected to an adjacent blank cut so as to form a film strip.

As already explained, the request can be processed in the sequence in which it was received. One variant is that from certain requests which can be received, only a sub-selection is accepted. Thus, for example, when producing parts for the automotive supply sector, a total of n different colors, structures or materials can be selected and thus can be sent as request to the thermoforming system wherein, however, the thermoforming system can only receive m different film rolls at the same time ready to be delivered to the transport system to the thermoforming station, so that the m currently loaded films are processed immediately upon request, whereas requests for the n-m remaining variants of films are initially deferred. For example, a maximum limit value for waiting orders can be permitted.

Preferably, changing a film is carried by means of the film roll while other films are still accessible by the thermoforming system. Thus, for example, it is signalized to the system, or the system signalizes to the user, that of the three film rolls A, B, C available in a common supply shelf, exactly one roll, namely the roll A is now to be replaced by a different roll D or by a replacement roll A'. Nevertheless, the system can still continue to work. During the changeover time, the system only processes requests for the films B and C. The requests for A or D or further film types accruing in the meantime are stacked and subsequently processed.

The thermoforming system preferably comprises in a conventional manner a clamping frame at the thermoforming station. In a particular configuration, said clamping frame can have a recess for connecting points or for a connecting line, thus a point- or line-shaped recess in which a bulge can press in, namely a bulge that occurred as part of the connecting process of the two adjacent blank cuts. The vacuum can then be established with proven reliability.

It is proposed that the thermoforming system is designed without cooled transverse bars which, for instance, would be transported through the system with joints of two adjacent blank cuts.

According to a third aspect of the present invention, the object is achieved by a film supply station for the above-described thermoforming system, with a plurality of roll holders for an equal plurality of film rolls, with an unwinding device and with a separating device for preparing the blank cuts. Preferably, a connecting station is also integrated in this structural unit, primarily at the separating device.

According to a fourth aspect of the present invention, the object is achieved by a film strip for industrially processing in a thermoforming system for laminating carrier parts or for preforming films, which film strip is joined together in the longitudinal direction from blank cuts of different films, wherein the blank cuts are connected to one another in a tensile-stress-resistant manner.

It is explicitly pointed out that such a film strip is present not only upstream of the molding tool, but, depending on the kind of cut-out, normally also in the form of a film grid downstream of the forming station. In the feeding system to the molding tool, the assembled film strip is easier to handle, saves film because the transverse clamping bars in the heating station are no longer required, and guarantees fast production on a high quality level. However, handling downstream of the molding tool, in the film grid, is very easy as well. If the entire film grid can be disposed of in a uniform way, it can be coiled in simple manner, for example.

If the remaining grid is to be disposed of in a different manner, for example because materials were used which are to be disposed of differently and which are connected to one another so as to form a film strip, then it is proposed to separate them accordingly downstream of the molding tool.

It is to be understood that the advantages of the aforementioned inventive aspects also have a direct advantageous effect on the laminated part produced in this manner.

BRIEF DESCRIPTION OF THE DRAWINGS

The invention is explained in more detail hereinafter based on exemplary embodiments with reference to the drawing. In the figures.

DETAILED DESCRIPTION OF THE PREFERRED EMBODIMENTS

Figure 1:
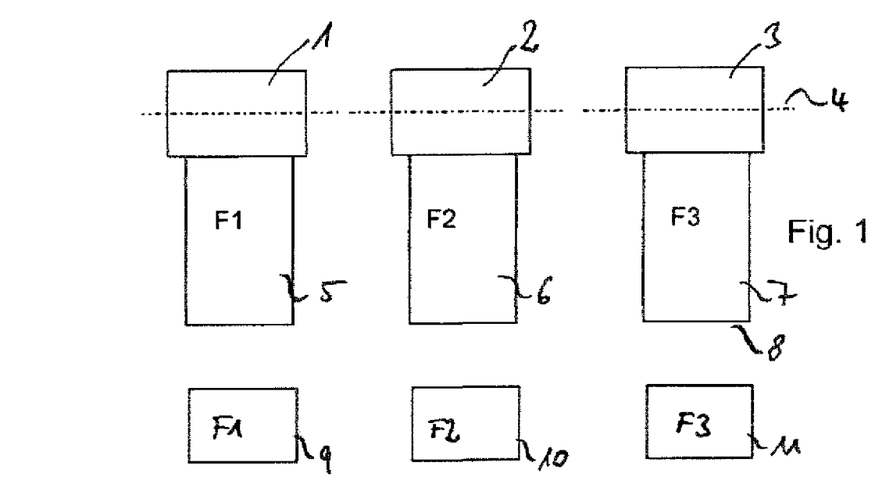
FIG. 1 shows schematically a top view of three film rolls with different films and with blank cuts separated therefrom.

The three film rolls 1, 2, 3 in FIG. 1 are each mounted to be rotatable about a roll axis 4. Unwound therefrom are three pieces of film strip 5, 6, 7. The first film strip 5 consists of a first film type F1. The second film strip 6 consists of a second film type F2. The third film strip consists of a third film type F3. At the front end edges 8 (indicated exemplary) of the film strips 5, 6, 7 unrolled from the film rolls 1, 2, 3, three blank cuts 9, 10, 11 were cut off by a separating device (not illustrated) by means of clean cuts.

Like the film strips 5, 6, 7, the three blank cuts 9, 10, 11 consist of different film materials and different film colors of the film types F1, F2, F3.

All three film types F1, F2, F3 are thermoplastically deformable in a thermoforming system. They are in particular suitable to be laminated onto a carrier. The film types F1, F2, F3 can be, for example, a differently colored synthetic material with a grained leather-like look, or they can be smooth films onto which, for example, a leather-like grain is embossed at a later time, preferably in-mold in the molding tool.

Figure 2:
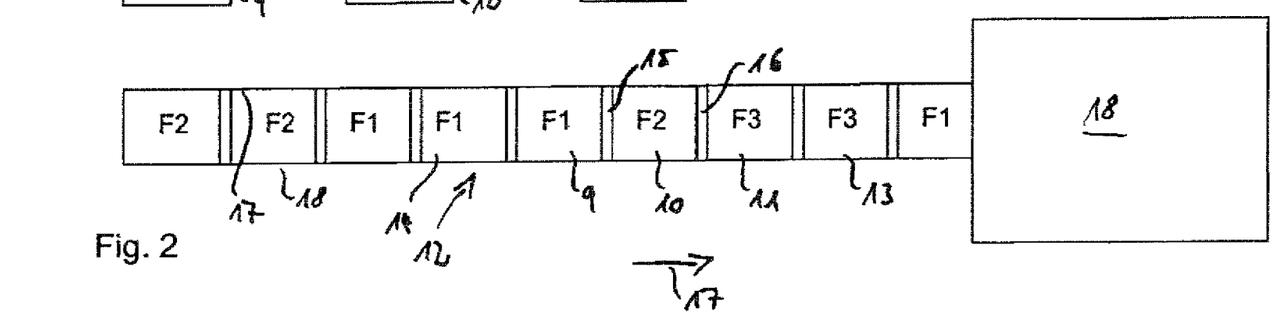
FIG. 2 shows schematically a top view of three different blank cuts of the three film rolls from FIG. 1 that are connected to one another so as to form a film strip, being fed into a thermoforming station.

When connecting a multiplicity of blank cuts 9, 10, 11 so as to form a film strip 12, the three blank cuts 9, 10, 11 from FIG. 1 in the present example are adjacent to further blank cuts 13, 14 (numbered exemplary). Overlaps 15, (indicated exemplary) form connecting regions in which the blank cuts 9, 10, 11, 13, 14 are firmly connected to one another by means of an adhesive bond, for example.

Along a machine direction 17 toward the thermoforming station 18, the blank cuts 9, 10, 11, 13, 14 of the connecting region are connected to one another in a tensile-stress-resistant manner. At lateral edges 170, 180, the assembled film strip 12 is additionally held by a pair of needle chains (not illustrated).

The formation of the film strip 12 consisting of the blank cuts 9, 10, 11, 13, 14 of the film types F1, F2 F3 corresponds to a sequence to be produced which, for example, was addressed in the form of a series of in each case individual requests to the thermoforming system.

Within the thermoforming station 18, the film strip 12 runs over a spatially formed laminating carrier 20 (see FIGS. 3 and 4) within the clamping frame 21. The clamping frame 21 consists of a clamping frame top 22 and a clamping frame bottom 23.

Figure 3:
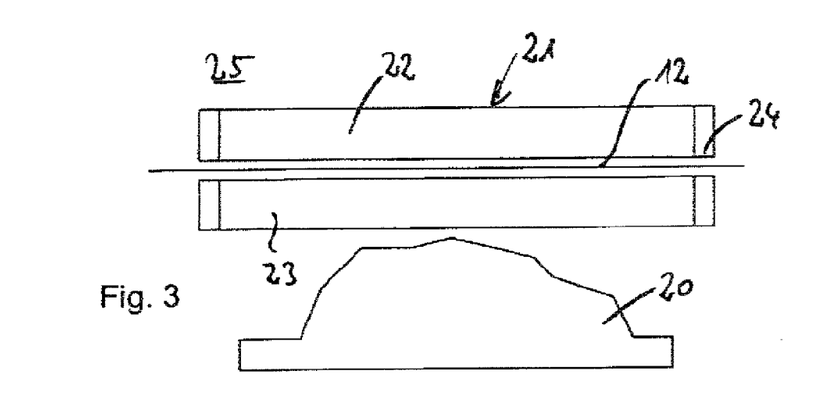
FIG. 3 shows schematically a side view of a molding tool with a clamping frame located thereabove and a film strip running therein.
Figure 4:
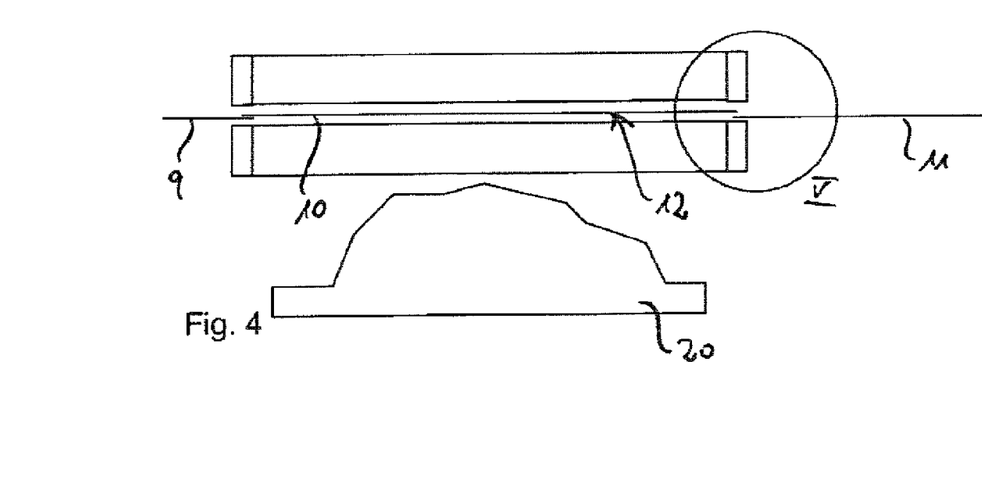
FIG. 4 shows the illustration from FIG. 3 with blank cuts of the film strip drawn in an exploded view.

For operating the thermoforming station, the clamping frame top 22 and the clamping frame bottom 23 close against one another. Thereby, the film strip 12 is firmly clamped along a frame outline 24. The film strip 12 portion located inside the clamping frame 21 can then be very easily drawn onto the laminating carrier 20 by means of a vacuum, for example through vacuum holes (not illustrated). In this position, slight cooling takes place after the film strip 12 was heated up earlier by means of radiant heaters (not illustrated).

Thus, in the thermoforming station 25, that portion of the film strip 12 that is located within the circumferential frame 24 of the clamping frame 21 is laminated onto the laminating carrier 20, and thereby the finished part is produced ready for installation in a motor vehicle.

In the exploded view (see FIGS. 4 and 5) it is apparent that the film strip 12 is originally composed of three different blank cuts 9, 10, 11 (selected exemplary). In an overlap region 16, a connection by means of a narrow adhesive tape is arranged perpendicular to the machine direction 17 over the entire width of the blank cuts 10, 11. The adhesive tape firmly holds the two blank cuts 10, 11 together.

Figure 5:
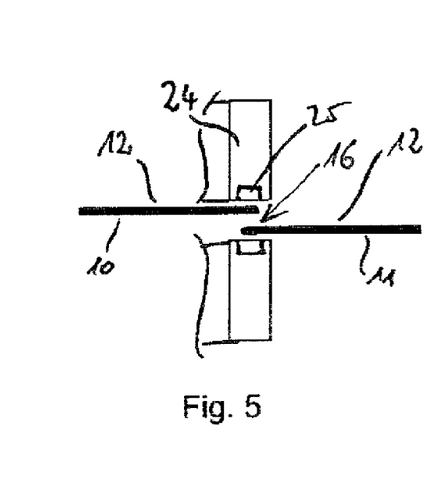
FIG. 5 shows schematically the detail from FIG. 4.

Due to the overlap in the overlap region 16, a bulge of the film strip 12 with respect to the individual blank cuts 10, 11 can be found. In order to be able to receive said bulge and still be able to close the clamping frame 21 in a vacuum-tight manner, in each case one seam receptacle 25 is situated in the clamping frame top 22 and in the clamping frame bottom 23, which seam receptacle extends perpendicular to the machine direction 17 over the entire width of the film strip 12.

When the clamping frame 21 closes during the operation of the thermoforming system, the overlap region 16 of the two blank cuts 10, 11 is firmly clamped and thus is excluded from processing. This is exactly what is intended because the overlap region 16 of the two blank cuts 10, 11 would not have been processible for a part anyway.

Figure 6:
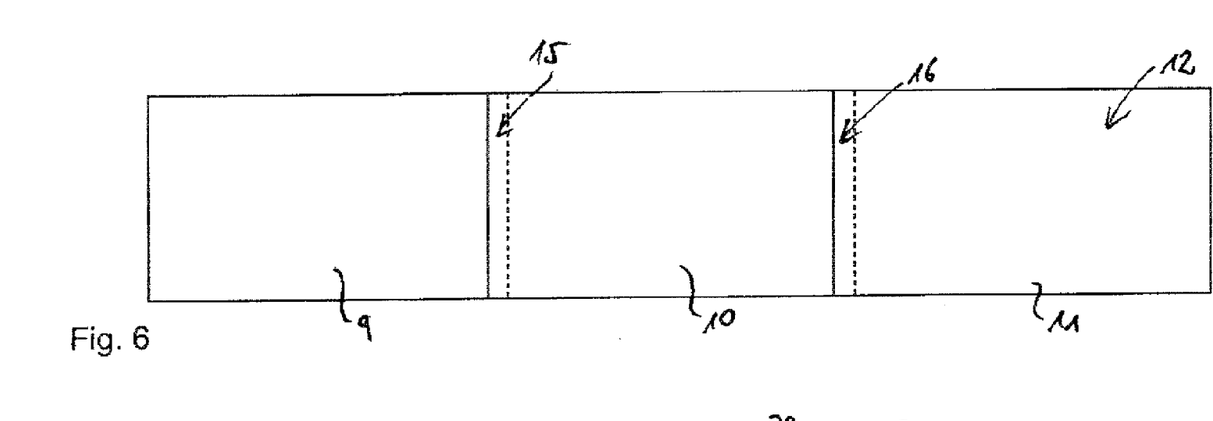
FIG. 6 shows schematically a top view of a piece of film strip with three blank cuts and two connecting regions with an overlap.
Figure 7:
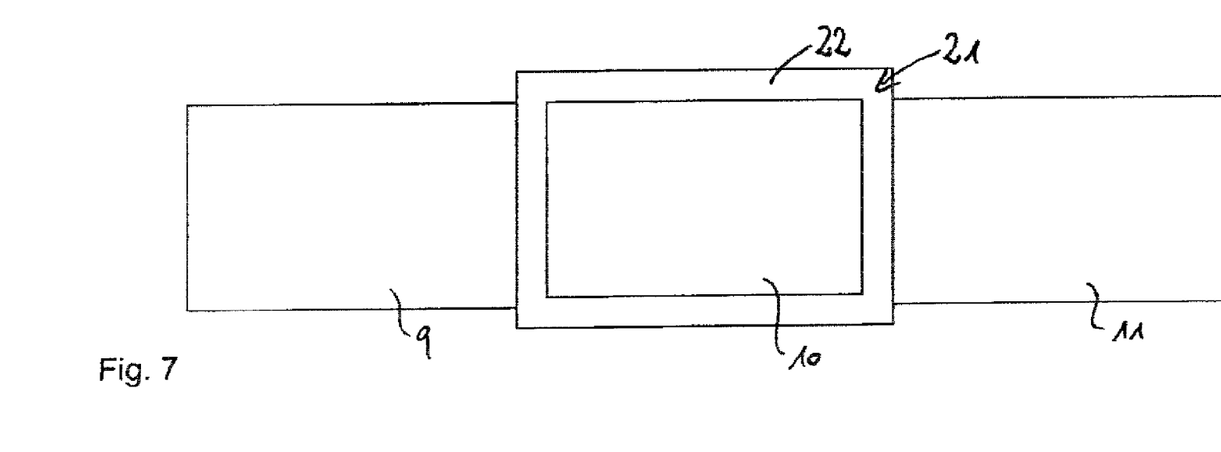
FIG. 7 shows the piece of film strip from FIG. 6 with a clamping frame top located thereabove.

With each machine cycle, the film strip 12 is therefore cycled forward by one length of the clamping frame 21, or more precisely, by the distance between the two centers of the frame outline 24. By suitably controlling, the overlap regions 15, 16 can then always be positioned exactly underneath the frame outline 24 of the clamping frame 21 (see in particular FIGS. 6 and 7).

Figure 8:
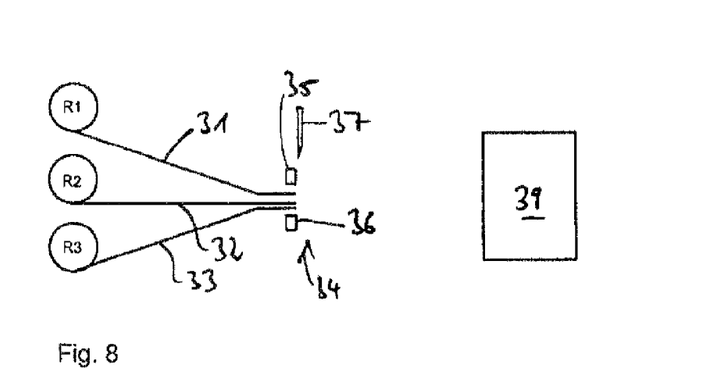
FIG. 8 shows schematically a side view of three film rolls with different films, a cutting device and a thermoforming system.
Figure 9:
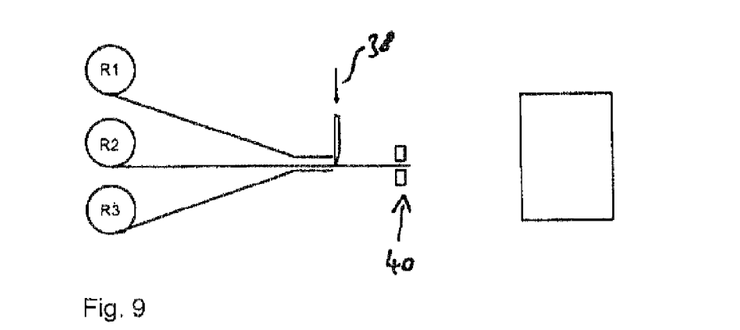
FIG. 9 shows the arrangement from FIG. 8 with a film piece that is pulled out, and a cutting knife in engagement.
Figure 10:
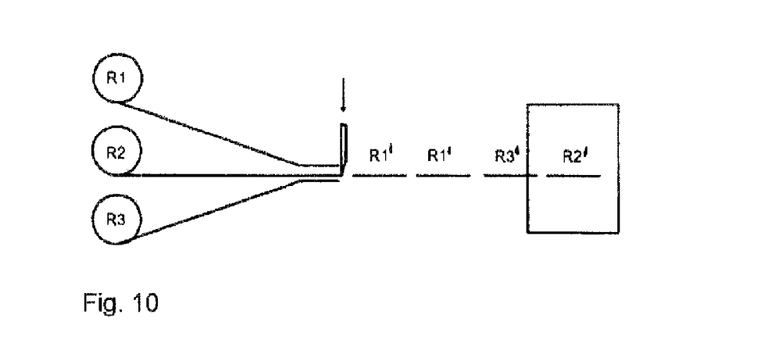
FIG. 10 shows the arrangement from the FIGS. 8 and 9 with schematic illustrations of a plurality of produced blank cuts.

In the arrangement of the three film rolls R1, R2, R3 in the FIGS. 8, 9, 10, the three film rolls R1, R2, R3 are placed in a common film roll shelf. Unwound film strip pieces 31, 32, 33 go to a common separating station 34. The separating station has in first instance an upper guide 35 and a lower guide 36 for the film strip pieces 31, 32, 33. Directly downstream thereof there is a cutting knife 37. The cutting knife 37 is mounted to be movable; in the exemplary embodiment shown here it is movable vertically downward along a cutting direction 38 (cf. FIG. 9).

In order to obtain individual blank cuts R1', R2' R3' (cf. FIG. 10) during the operation of the system and for supplying to the thermoforming station 39, the upper guide 35 and the lower guide 36 of the separating station 34 can specifically grip a film strip piece and can unwind it from the roll (here R2) by displacing it into a downstream position 40. Then, a cut is carried out on the unwound film strip piece with the cutting knife 37 so that the blank cuts R1', R2', R3' are obtained from the respective film rolls R1, R2, R3.

Subsequently, the blank cuts R1', R2', R3' are connected (not illustrated in FIG. 10) and reach the thermoforming station 39 only in connected form as a new film strip.

In the separating station 34, for example, a gripper or roller system can grip the respective film and unwind it from the roll.

The blank cuts are either connected or transported individually into the thermoforming system and are processed therein.

In other words, a conceivable system concept comprises that prefabricated film cuts in all needed colors or structures are placed by means of a device into a connecting station, which is arranged upstream of the film infeed, in such a manner that they are either connected edge to edge or transversely with a slight overlap. For connecting, for example, high-frequency welding, thermal contact welding, adhesive and further connecting means can be considered.

The position should be selected such that the joint is always positioned underneath the transverse bar of the clamping frame.

Thereby, a continuous film with different colors is obtained which can be processed with little material loss.

If necessary, automatic adjustment of the heater in the system should take place for different colors or structures.

For processing the different colors, conventional laminating stations and, in general, thermoforming system can be used. The system not even "recognizes" that the incoming film strip is composed of individual blank cuts.

Upstream of the film infeed, a film star can be arranged for different colors or structures, thus, in general, for the different film types.

For example, in each case one film is cut to size and is placed onto the connecting station and is connected.

Upstream of the film infeed, a device can be provided onto which the blank cuts are placed so that the newly unwound film is positioned either edge to edge or slightly overlapping with the preceding blank cut. Onto this device, a device for connecting the film is mounted which is adjustable in terms of the blank cut length.

In the case of a plurality of cycles with the same color, preferably, the films are connected to the last blank cut and only cut again to the exact length if a sufficiently long film strip piece is unwound from the film roll so as to process the planned cycles. Thus, in this case too, a blank cut is obtained that is connected to a preceding blank cut, but with the difference that in this case, the blank cuts do not have the same length.

If hot melt is applied, preferably, an inline hot melt application system can be positioned between the connecting station and the thermoforming station. Advantageously, time independence of the processing time of the hot melt is achieved in this manner. Moreover, positioning problems in the connecting station are prevented because after the hot melt application, the ends of the film can considerably curve upward.

In simple words, it is therefore preferred that hot melt is only applied if the blank cuts are already connected to form a film strip.

The devices for fabricating the film strip composed of blank cuts can be operated completely separate from the laminating system. The sequential film strip can even be purchased from a separate company.

Apart from that, with suitable film cuts there is the possibility to process even a two-colored film in the thermoforming station.

The invention claimed is:

1. A method for processing two different thermoplastic films in a thermoforming system,
   wherein on request selectively and varying from one film to another one, blank cuts are brought in a transport means through the thermoforming system so that different blank cuts are successively transported by the transport means to a thermoforming station and are processed there,
   wherein two successive blank cuts are connected to one another so as to form a film strip; and
   wherein a forward feed into a first clamping frame position takes place so that a clamping frame closes on a joint of the two blank cuts; and wherein the blank cuts are provided with the length of a clamping frame so that the clamping frame closes at a first and at a second position on both joints of three blank cuts.

2. The method according to claim 1, wherein in the machine direction, the blank cuts are firmly connected to one another, either edge to edge or with a slight overlap.

3. The method according to claim 1, wherein in the vertical direction, the blank cuts are connected to one another.

4. The method according to claim 1, wherein the blank cuts are connected to one another with plurality of connecting points and/or are provided with a connecting line; and
wherein the blank cuts are glued, sewed, welded together or are mechanically connected.

5. The method according to claim 1, wherein blank cuts from different materials are fed.

6. The method according to claim 1, wherein in dependence of the requested blank cut, a system program is varied.

7. The method according to claim 1, wherein, hot melt is applied onto the film strip.

8. The method according to claim 1, wherein the method is used for laminating a contour-formed carrier part or for performing films.

9. The method according to claim 6,
wherein a heat output is varied.

10. The method according to claim 8,
wherein the method is used for providing an interior surface part for a motor vehicle, and primarily by means of thermoforming or by means of back-injection of the film.

\* \* \* \* \*